(12) United States Patent
Dreischer et al.

(10) Patent No.: US 6,246,501 B1
(45) Date of Patent: Jun. 12, 2001

(54) METHOD AND ARRANGEMENT FOR AN INTERRUPTION-PROOF OPTICAL SATELLITE LINKAGE IN LEO NETWORKS

(75) Inventors: Thomas Dreischer, CH-Opfikon (CH); Hans Kellermeier, Neubiberg (DE)

(73) Assignee: Contraves Space AG, Zürich (CH)

( * ) Notice: Subject to any disclaimer, the term of this patent is extended or adjusted under 35 U.S.C. 154(b) by 0 days.

(21) Appl. No.: 08/882,268

(22) Filed: Jun. 25, 1997

(30) Foreign Application Priority Data

May 16, 1997  (CH) .................................................. 1153/97

(51) Int. Cl.$^7$ .................................................. H04B 10/105
(52) U.S. Cl. ............................................ 359/172; 359/159
(58) Field of Search ..................................... 359/172, 159

(56) References Cited

U.S. PATENT DOCUMENTS

| | | | |
|---|---|---|---|
| 4,867,560 | * | 9/1989 | Kunitsugu ............................ 356/152 |
| 5,184,241 | * | 2/1993 | Schwemmer ......................... 359/161 |
| 5,218,467 | * | 6/1993 | Ross et al. ............................ 359/172 |
| 5,592,320 | * | 1/1997 | Wissinger ............................. 359/159 |
| 5,710,652 | * | 1/1998 | Bloom et al. ........................ 359/152 |
| 5,890,679 | * | 4/1999 | Chethik ............................ 244/158 R |
| 5,923,452 | * | 7/1999 | Carlson ............................... 359/172 |

OTHER PUBLICATIONS

P. Brunt, "Iridium—Overview and Status", Space Communications, vol. 14, p. 61–68, 1996.

S.G. Lambert et al., "Short–Range Multi–Terminal Satellite Crosslink Communications (U)", Institute of Electrical and Electronics Engineers, p. 1170–1174, Oct. 14, 1992.

Katsutoshi Tsukamoto et al., "Heterodyne Optical Detection/Spatial Tracking System Using Spatial Field Field Pattern Matching Between Signal and Local Lights", Electronics and Communications in Japan, part 1, vol. 77, No. 12, p. 746–757, Sep. 9, 1993.

Mitsuo Nohara et al., "A Link Study of a Low–Earth Orbit Satellite Communications System Using Optical Intersatellite Links", IEICE Trans. Commun., vol. E76–B, No. 5, p. 536–543, May 5, 1993.

D. Giggenbach, "Optische Kommunikation im Weltraum", Funkschau, vol. 68, No. 2, p. 68–70, Jan. 5, 1996.

\* cited by examiner

*Primary Examiner*—Leslie Pascal
(74) *Attorney, Agent, or Firm*—Browdy and Neimark

(57) ABSTRACT

The instant invention relates to a method and an arrangement for the employment of free space transmission systems for interruption-proof links between individual satellites of globally accessible Low Earth Orbiting satellite communications systems by utilizing so-called optical terminals.

3 Claims, 9 Drawing Sheets

METHOD AND ARRANGEMENT FOR AN INTERRUPTION-PROOF OPTICAL SATELLITE LINKAGE IN LEO NETWORKS

FIELD OF THE INVENTION

The invention relates to a method and an arrangement for the employment of optical free space transmission systems for interruption-proof linkages between individual satellites of globally accessible low earth orbiting satellite communications systems.

BACKGROUND OF THE INVENTION

The cellular communication networks which have lately been established worldwide in many densely populated regions provide an unprecedented measure of individual accessibility in cooperation with already established landline communications networks. The economic advantages for the consumers of corresponding services arising from this justify the high costs of the infrastructure connected with this. Under normal topographic conditions, a single fixed transmission station of such a network can cover mobile users at a distance of up to approximately 20 km, wherein the given maximum extent of a cell limited by this becomes considerably smaller in an unfavorable terrain. Based on positive experiences with communications satellites in geostationary orbits, the idea suggests itself to gain by similar means the considerable independence from the terrain achieved by this, as well as the large spatial extent of the covered area, also in connection with mobile communication systems.

While, because of the development of very low noise preamplifiers and mixers, radio reception from geostatic satellites became possible even with relatively small antennas, in connection with bidirectional linkages the problem of transmitting acceptable data rates over very large distances (approximately 36,000 km) by means of antennas transmitting almost non-directionally and at very low transmission output to the geostationary satellite remains. A solution of this problem lies in the use of satellites circling relatively low above the earth's surface, whose limited range is compensated by the presence of a multitude of identical satellites, which exchange information with each other and pass it on. Several concrete proposals already exist, among these are IRIDIUM (P. Brunt, "Iridium: Overview and Status", in Space Communications, vol. 14, No. 2, 1996, pp. 61 to 68), and M-STAR and TELEDESIC (System Description Excerpt, Mar. 21, 1994), wherein IRIDIUM will enter practical use before the end of the century.

A characteristic of all mentioned systems is the employment of a multitude of satellites moving in low orbits around the earth which, divided into sub-groups, are respectively evenly distributed over an orbit, which is distinguished in that it penetrates the plane containing the earth's equator at two points at an obtuse angle. The orbits of all satellites are arranged in respect to each other in such a way that an even coverage of the earth's surface by satellites is achieved. The orbits taken up by the satellites intercept each other in two points as a function of the inclination of the orbit. At the same altitude of all paths, a collision of satellites in different orbits is prevented by so-called inter-plane phasing and a selection of angles of the inclination of the individual orbital planes which is unlike 90°. At this time, the linkage of the individual satellites with each other takes place by means of appropriately aligned directional microwave antennas. This does not present a problem in connection with satellites in the same orbit, since the distance as well as the direction of the neighboring satellites are relatively stable. However, the situation becomes complicated with linkages with satellites of neighboring orbits.

In the course of one circumnavigation of the earth, a lateral change of the satellites flying along in neighboring orbits occurs at the intersections of all orbits. If there is a radio linkage with the satellites located laterally in respect to the direction of flight, it is necessary to perform tracking with the directional antenna over a larger angular spatial range as soon as the reception output falls below a minimum or, if this is not possible, a transfer to an antenna placed in a different direction must take place. The change of the directions of the neighboring satellites can take place almost instantaneously, if they are located nearly crosswise to the direction of flight. Therefore, under normal circumstances a transfer to another antenna takes place, because of which a contactless phase results because of the required acquisition time.

Also, rapid rotating movements of bodies of large mass and spatial expanse, which are attached to the satellite body, add to the destabilization of the latter. Finally, the limited extent of the directional antennas results in the transmission of energy over a comparatively large spatial angle, even when using microwaves, because of which as many different transmission channels as possible must be available in view of a situation of high density of satellites occurring on account of the closeness of the intersecting points of all orbits. This forces a limitation of the bandwidth of the individual channels because of the limited bandwidth of the directional microwave antennas employed. However, this is unacceptable for the linkage of the satellites with each other, since information from other satellites is also passed on via these linkages, so that the flow of information is considerably higher than in the traffic between the ground and the satellites.

OBJECT AND SUMMARY OF THE INVENTION

It is therefore the object of the invention described below, to prevent the disadvantages of the prior art and to assure communications links with arbitrary neighboring satellites of the above described systems which is free of interruptions and at high transmission rates by means of a device of small spatial size and low weight.

This object is attained by means of the method described in the characterizing portion of claims 1 to 3 and the arrangement described in the characterizing portion of claims 4 and 5.

The basic concept of the invention lies in the replacement of certain transmitting devices based on microwaves on board the satellites utilized in the above mentioned systems by optical communications terminals. These are installed in an at least fourfold arrangement on each satellite and contain a transmission device intended for transmission and reception, which is designed to be rotatable in azimuth and elevation by means of an optical head. Terminals in accordance with the invention are applied to the exterior surfaces of the satellite respectively both in the direction of movement and opposite the direction of movement of the satellite in such a way that the zero azimuth alignment of their telescopes coincides with the tangent of the orbit described by the satellite.

Further configurations can contain any arbitrary number of terminals, in particular for the simultaneous maintenance of more than two linkages with neighboring satellites. Furthermore, in addition to other current systems, the homodyne method is provided for a data exchange between two satellites, which is unaffected by foreign light sources. It is possible in this way to also detect the signal of a satellite located directly in front of the sun. In the course of passing through the intersection points of all orbits, the contact made with a satellite which is in another, lateral orbit is maintained by tracking by means of the telescope, which is rotatable around two axes and is small and light. Tracking is also performed by means of coherently detected difference signals, and is therefore unaffected by interferences caused by the sun or other external light sources. Furthermore, the optical output of the light beam transmitted from an optical terminal is concentrated in a very narrow angular range in spite of the small aperture of the telescope, so that the required transmitting output is very low.

The very exact alignment of the light beam with the desired satellite required because of this also simultaneously contains as a critical factor the advantage of interference-free communication with satellites arranged at a short mutual distance, such as is the case in the area of intersecting orbits.

A further advantage resides in the extreme large bandwidths which can be made available by optical communications. For example, at a wavelength of 1500 nm a spectral segment of a width of 1 nm in the frequency range represents a bandwidth of approximately 130 GHz. Line-dependent optical transmission systems, which are exposed to the adversities of the transmitting medium, in particular the dispersion of the group delay time, allow the transmission of several hundred Gbits per second. By means of the optical linkage of the satellites of the above described systems it is possible to release the bandwidth in the microwave spectrum for the communication between the earth and the satellite, wherein the increase in the data flow between the satellites triggered by this can be handled without problems by optical systems.

Further details, characteristics and advantages of the invention ensue not only from the claims and the features to be found therein, either by themselves and/or in combination, but also from the following description of preferred exemplary embodiments.

DETAILED DESCRIPTION OF THE PREFERRED EMBODIMENTS

Figure 1:
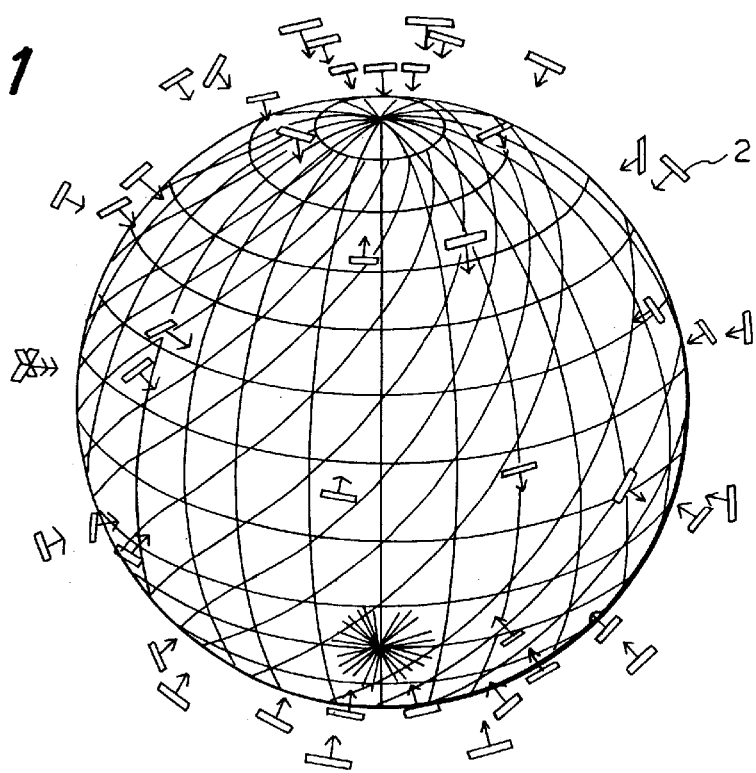
FIG. 1 shows the IRIDIUM network consisting of sixty-six satellites.
Figure 2:
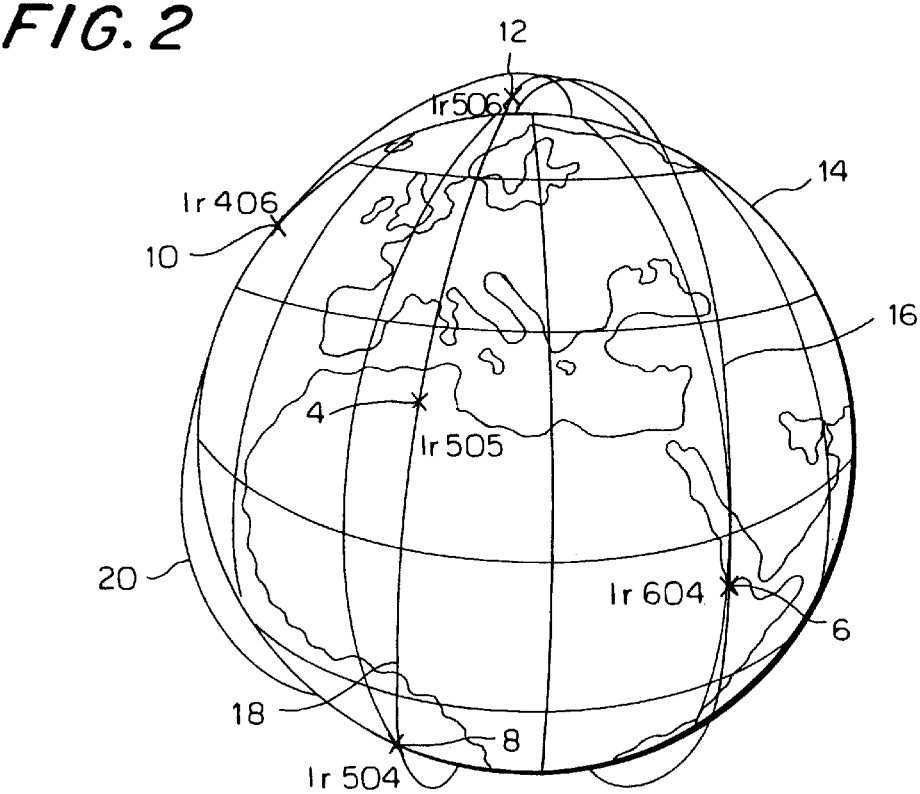
FIG. 2 is the perspective representation of a selected group of satellites of the IRIDIUM network.
Figure 3:
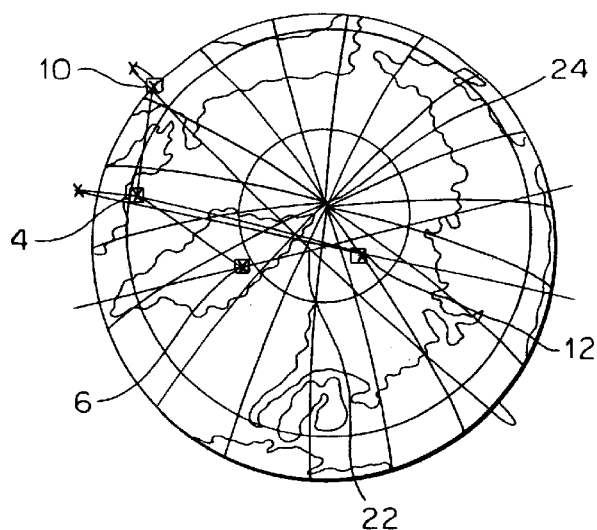
FIG. 3 represents the group in FIG. 2 prior to passing the north pole.

The sixty-six satellites 2 of the IRIDIUM network are schematically represented in their orbits around the earth in FIG. 1. To clearly show the structure of the network between the individual satellites, only one group of satellites directly connected with each other by communications links is represented in FIG. 2. A satellite 4 is the central element of this group, which is connected with satellites 12 and 8 which precede and follow it in its own orbit 18. Two further satellites 10 and 6 located in neighboring orbits 20 and 16, together with the satellite 4, form paths which form an angle of approximately 300° or approximately 120° with the tangent at the orbit of the satellite 4. In this representation the ensemble constituted by the satellites 4, 6, 10 and 12, together with the paths symbolizing the links, passes through one intersection of all orbits of IRIDIUM satellites, which is located in the vicinity of the north pole 24, wherein the angle between the tangent at the orbit in the position of the satellite 4 and the paths to the satellites 6 and 10 moving in the neighboring orbits changes in the course of a lateral change of the satellites 6 and 10.

Figure 4:
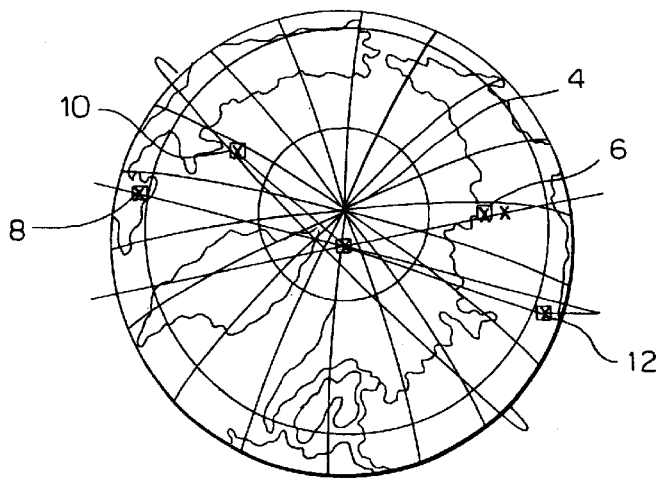
FIG. 4 represents the group in FIG. 2 in the course of passing the north pole.
Figure 5:
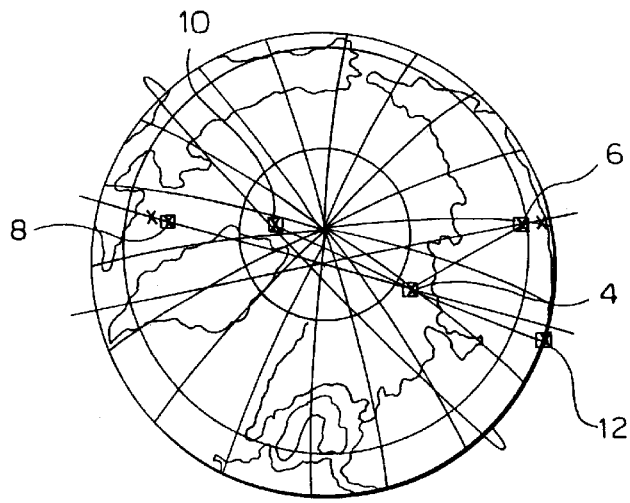
FIG. 5 represents the group in FIG. 2 after passing the north pole.
Figure 6:
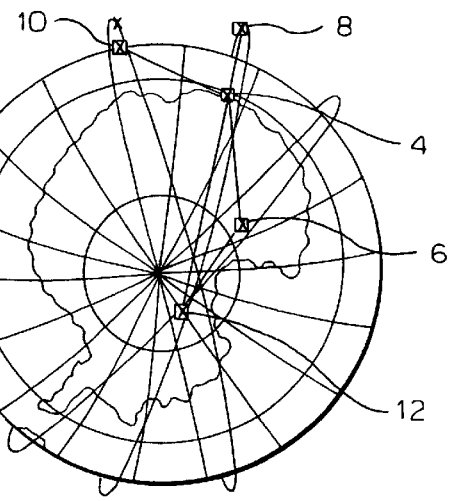
FIG. 6 represents the group in FIG. 2 prior to passing the south pole.
Figure 7:
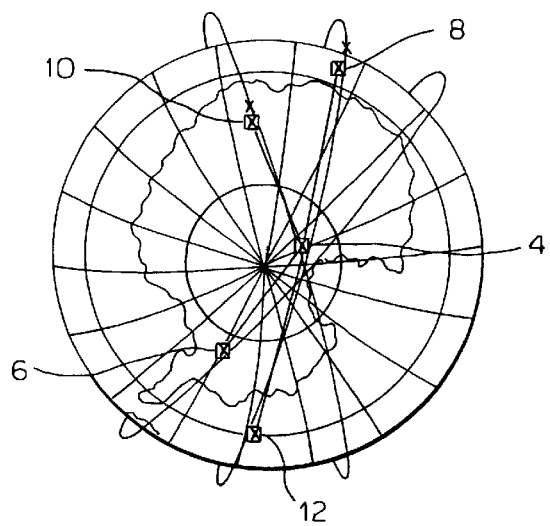
FIG. 7 represents the group in FIG. 2 in the course of passing the south pole.
Figure 8:
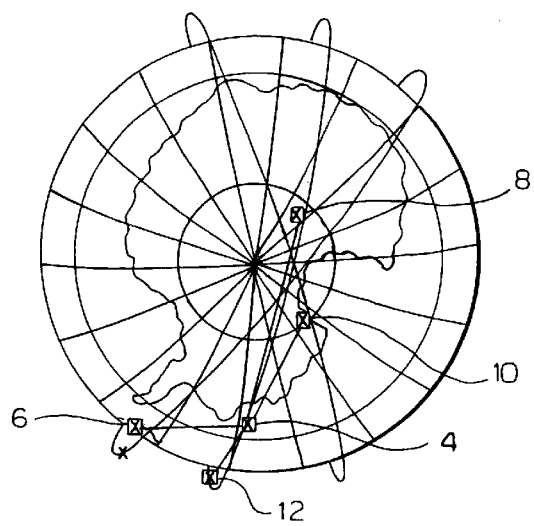
FIG. 8 represents the group in FIG. 2 after passing the south pole.

FIGS. 4 and 6 represent two further phases in the area of the orbits intersecting in the vicinity of the north pole, while the same situation in the vicinity of the south pole is represented in FIGS. 6 to 8.

FIGS. 6 to 8 show the ensemble of satellites known from FIGS. 2 to 5 prior to, during and after passing the intersection point located in the vicinity of the south pole of the orbits through the central satellite 4.

Figure 9:
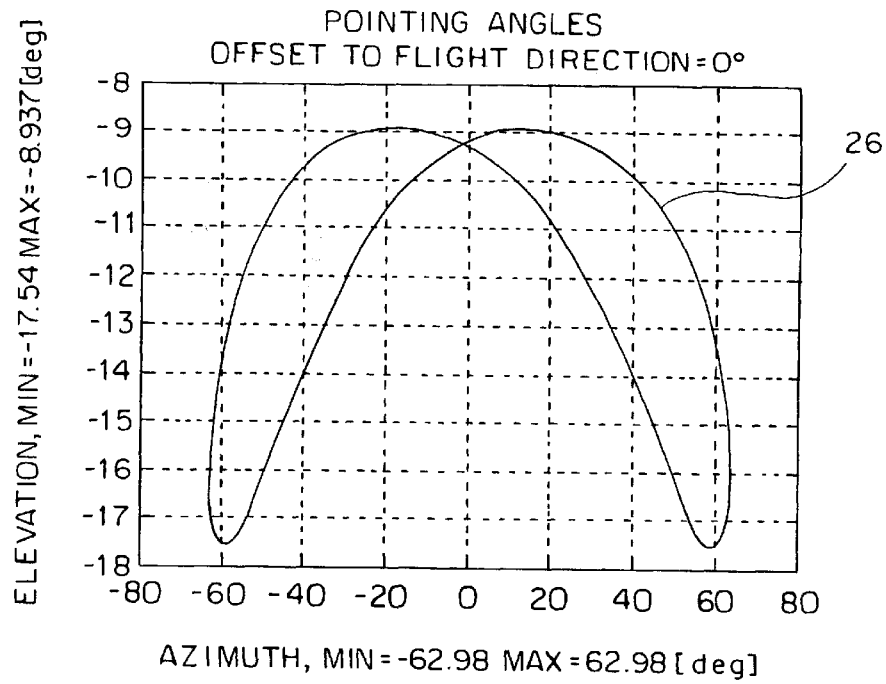
FIG. 9 is a diagram of the azimuth and elevation coverage angle of the nearest neighboring IRIDIUM satellite in another orbit.

A curve represented in FIG. 9 shows, from the perspective of the satellite 4, the azimuth and elevation coverage angle of a satellite 6 or 10 moving along in a neighboring orbit, which passes through the intersection points of all orbits in front of or after the satellite 4, during a full orbit around the earth. The elevation coverage angle along the curve 26 changes by less than twice its minimal value, so that the mutual distance between the satellites 6 or 10 and 4 is also sufficiently great when passing through the intersection point of the orbits in order not to cause an abrupt angular change of the paths between the satellites 6 or 10 and 4.

Figure 10:
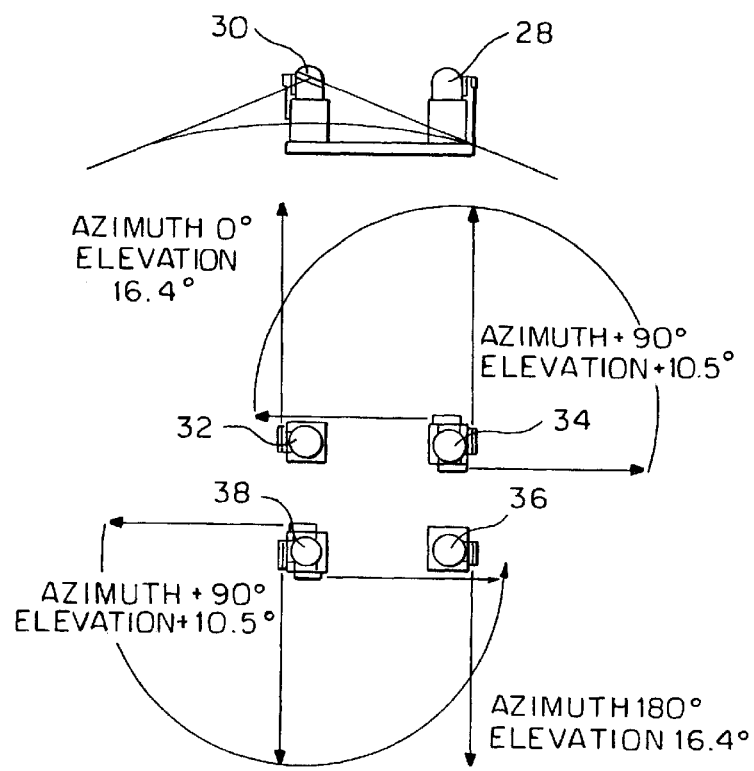
FIG. 10 shows a configuration for IRIDIUM consisting of 4 terminals.

The communication terminals required for optical links can be attached to the satellite in the manner represented in FIG. 10. While one optical terminal 32 maintains the linkage with the satellite 12 moving in front in the same orbit, the satellite 8 moving behind in the same orbit is covered by a further optical terminal 36. The two further optical terminals 34 and 38 cover the area of the satellite which is to the left or right in the direction of movement and therefore the nearest satellites 10 and 6 which move along in the neighboring orbits. Due to the physical nature movements of satellites in lateral orbital planes, 10 and 6, with respect to satellite 4, the satellite appearing on the left can be tracked interruption proof by the optical terminal 34, looking in direction of the movement of satellite 4 and the satellite appearing on the right can be tracked interrupton-proof by the optical terminal 38, looking opposite the direction of the movement of satellite 4.

This applies as the lateral satellites 10 and 6 turn out to move in the way of pendulums which swing around the tangent to the orbital plane for and after satellite 4, due to the existence of the two intersection zones of all orbital planes which occur in each LEO network. (Here, and in the following claims, "LEO" or "LEO-type" refers to a configuration of the network typically associated with a "Low Earth Orbit", and does not refer to satellite height. The present invention is not limited to any particular orbital height.) For this reason it is possible by means of both optical terminals 34 and 38 to follow without interruption the satellites 6 and 10 moving along in neighboring orbits over the intersection points of the orbits, from which the continuous availability of the optical transmission path results. A front or a rear view of the arrangement of the optical terminal shows an optical terminal 28 for maintaining the linkage with a satellite moving in front or behind in the same orbit, and an optical terminal 30, whose connecting path, starting at this terminal, with a satellite optionally moving along to the right or left is shown in the form of two lines.

Figure 11:
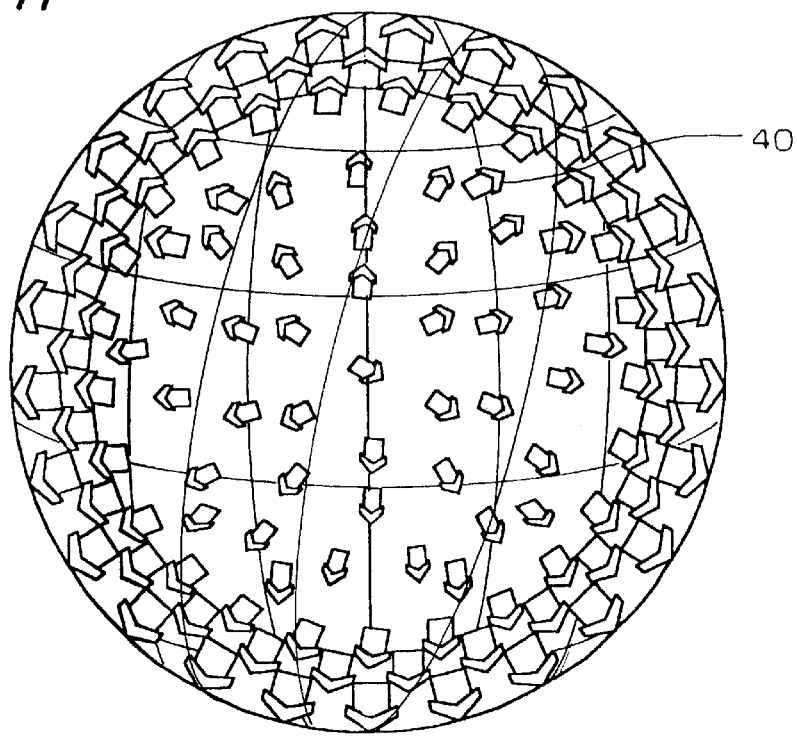
FIG. 11 represents the TELEDESIC network consisting of 840 satellites.
Figure 12:
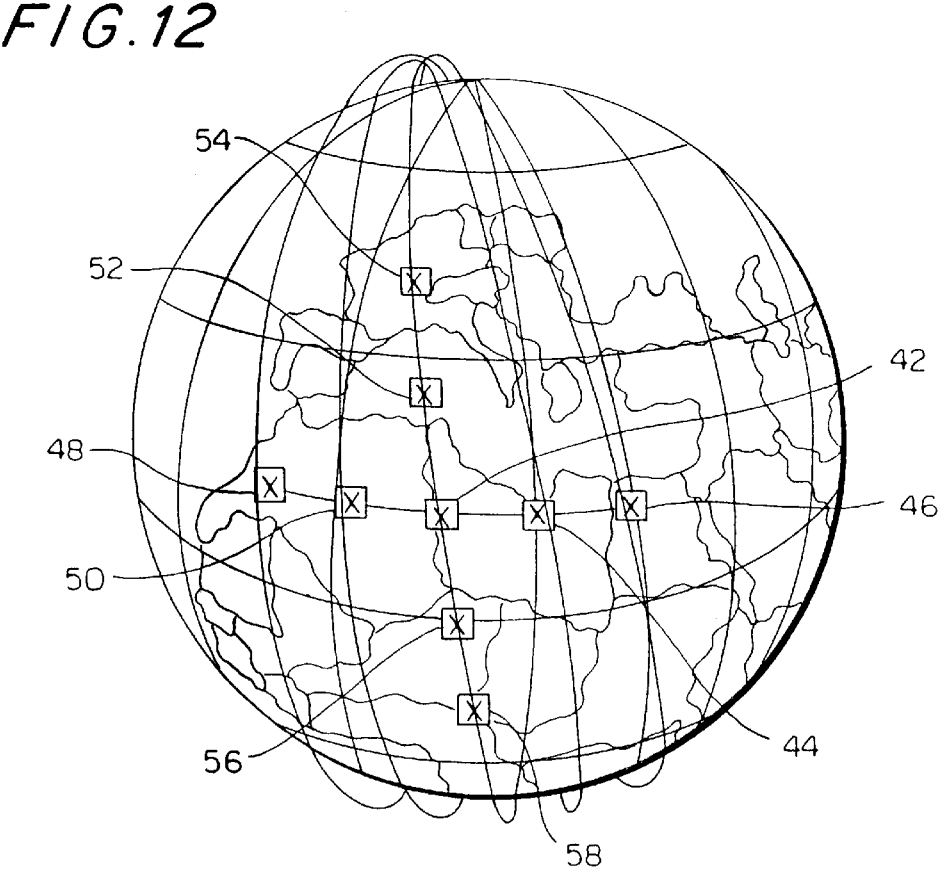
FIG. 12 is the perspective representation of a selected group of satellites of the TELEDESIC network.

FIG. 11 represents the completely installed TELEDESIC satellite network with 840 satellites 40. A selected group of TELEDESIC satellites, which are linked with each other, is represented in FIG. 12. The depth of linkage of individual groups is greater than with IRIDIUM, respectively two satellites 52 and 54 or 56 and 58, moving in front or behind in the same orbit, as well as satellites 44 and 46 or 50 and 48, located in neighboring orbits to the right or left, are connected with a central satellite 42 of the group.

Figure 13:
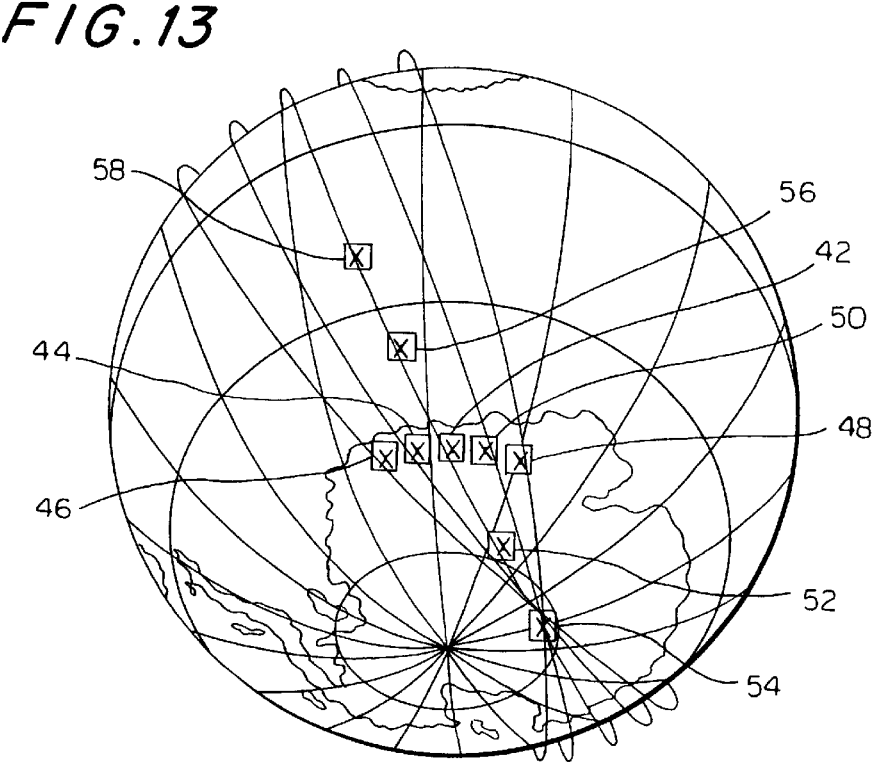
FIG. 13 shows the group of FIG. 12 prior to passing the south pole.

FIG. 13 shows the group of satellites in FIG. 12 prior to passage of the intersection point of all orbits located in the vicinity of the south pole, in which a satellite 54 is located.

Figure 14:
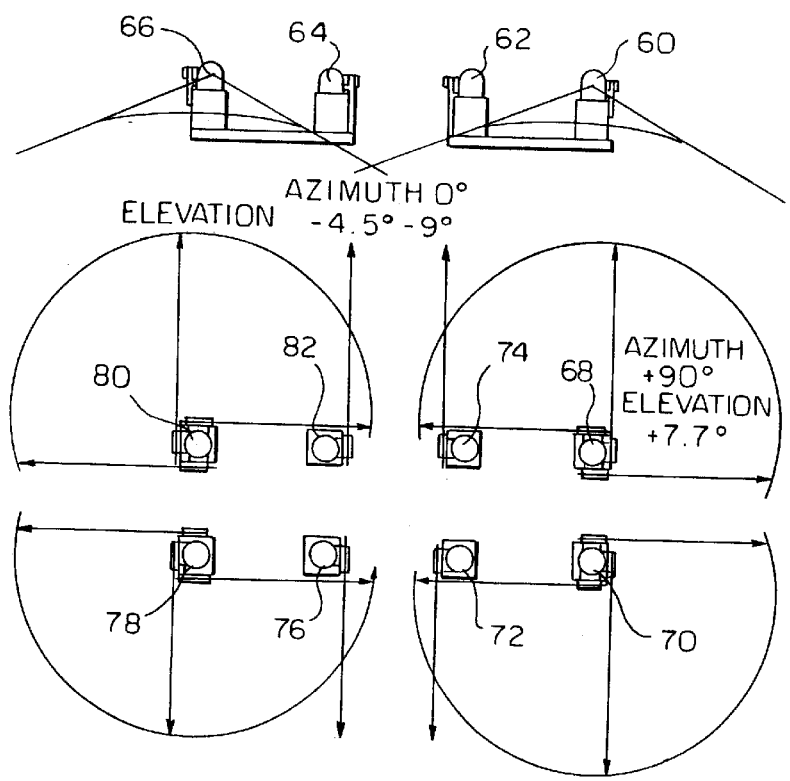
FIG. 14 represents a configuration for TELEDESIC consisting of eight terminals.

FIG. 14 shows a corresponding arrangement of the required optical terminals on the satellite 42. The optical terminals 74 and 82 maintain the linkages with the two satellites 52 and 54, which move in front in the same orbit, further optical terminals 72 and 76 are directed to the two satellites 56 and 58 moving behind in the same orbit. Additional optical terminals 78 and 80 or 68 and 70 maintain the linkage with the two nearest satellites moving to the left or right of the orbit of the central satellite 42. As can be seen from the front or rear views of the arrangement of the optical terminals, because of the required optical coverage angle as well as their distance from each other on the satellite body, optical terminals 60 and 66, provided for the linkage with satellites moving in lateral orbits and grouped next to the optical terminals 62 and 64, which are attached for satellites moving ahead or behind in the own orbit, cover satellites moving along on both sides. By means of this it is also possible to track satellites moving along on the side without chronological gaps in the course of one circumnavigation of the earth.

Figure 15:
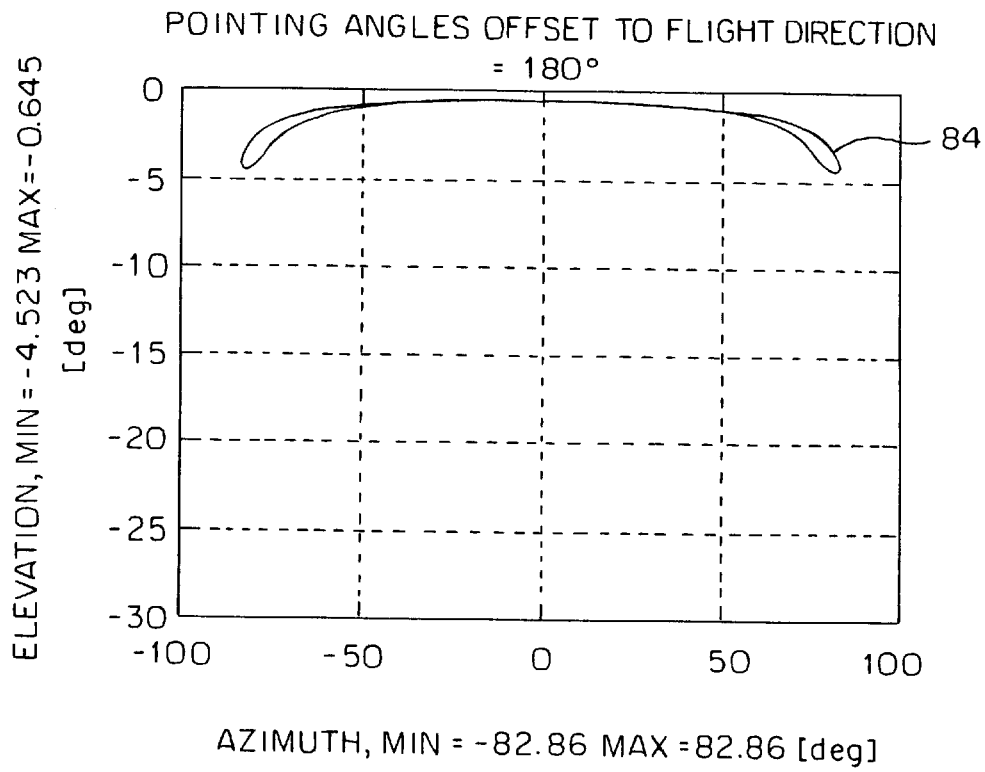
FIG. 15 is a diagram of the azimuth and elevation coverage angle of the nearest neighboring TELEDESIC satellite in another orbit.

FIG. 15 shows the azimuth as well as the elevation coverage angles which the connecting line to the satellites 44 and 50 describes in the course of a full circumnavigation of the group of the earth, provided the satellites 44 and 50 pass first through the intersection points of the orbits. When the central satellite 42 passes the intersection points of all orbits, the curve indicates an elevation coverage angle of approximately 1° which, with the strong curvature of near-earth orbits, suggests a short distance between the satellites. Azimuth coverage angles of approximately 90° while the group passes over low latitudes of the earth therefore suggest a very rapid change in the direction of the satellites moving along on the right or left which, however, can still be managed with a small and light optical terminal.

Figure 16:
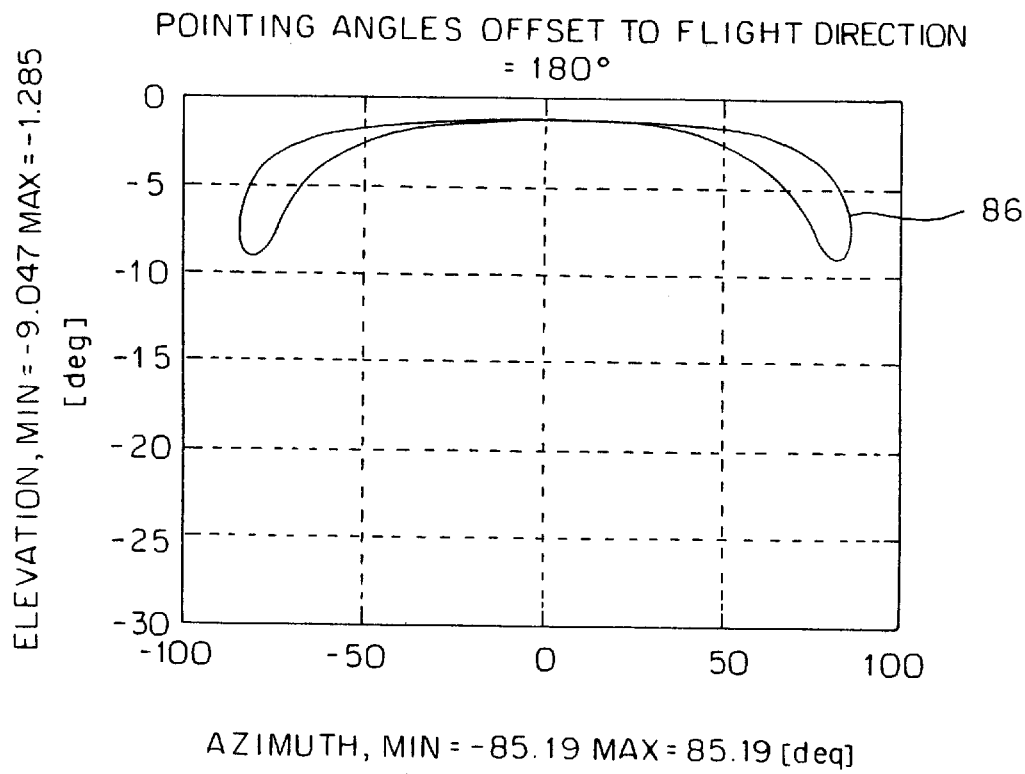
FIG. 16 is a diagram of the azimuth and elevation coverage angle of the next but one neighboring TELEDESIC satellite in another orbit.

An analogous curve 86 for the satellites 46 and 48, which are respectively the next but one in neighboring orbits, is represented in FIG. 16. In spite of an only slightly greater elevation coverage angle of approximately 2° at the intersection point, the small structural size of the optical terminals 60 and 66, together with their arrangement in accordance with FIG. 14, where they are offset in respect to each other, assures the gapless tracking of satellites moving laterally along over a full circumnavigation of the earth of the entire group without blocking each other.

Figure 17:
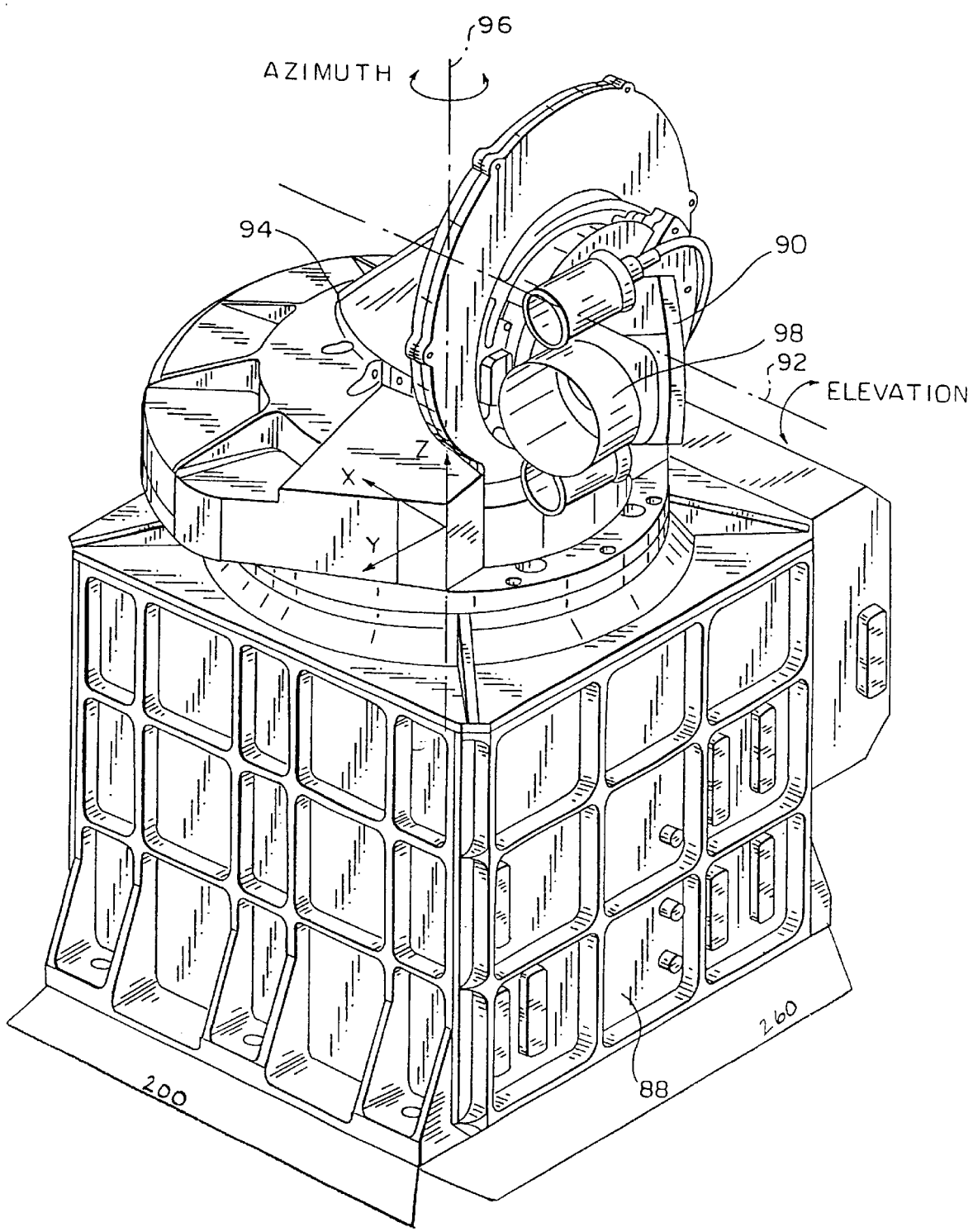
FIG. 17 represents a first exemplary embodiment of an optical terminal.

The structure of an optical terminal is represented in FIG. 17. A housing 88 contains, besides elements of the electronic devices required for control and signal processing, essential elements of the optical system, which is described in detail in Swiss Patent Application 0548/97. In addition to various detectors and sensors, there is space for an essential portion of the telescope, the alignment of which can be controlled by means of rotatable deflecting mirrors. An opening 98, which can be aligned, of the telescope can be adjusted in elevation by means of a mirror 90 rotatable around an elevation axis 92, and in its azimuth angle by means of a mirror 94 rotatable around an azimuth axis 96.

Figure 18:
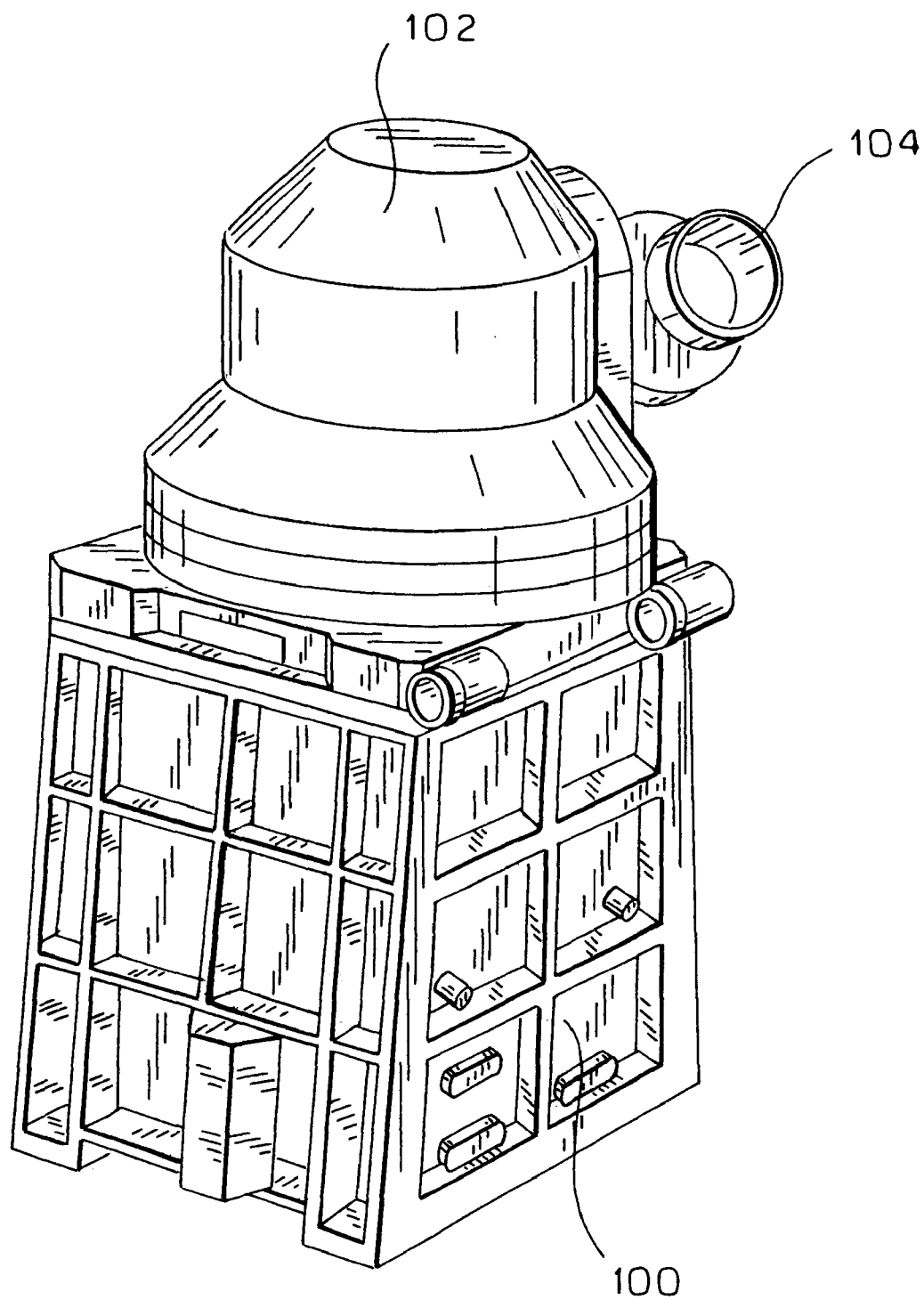
FIG. 18 represents a second exemplary embodiment of an optical terminal.

The further embodiment of an optical terminal represented in FIG. 18 has a structure similar to that represented in FIG. 17. An adjustable opening 104 of a telescope is, similar to FIG. 17, attached to a mirror rotatable around an elevation axis and is connected with a body 102, which is rotatable around an azimuth coverage angle axis and rests on a housing 100.

What is claimed is:

1. An arrangement for the interruption-proof operation of communications links between satellites in LEO networks, each satellite describing an orbit,
   characterized in that
      several links with neighboring satellites (4 to 20 and 42 to 58) located in as well as opposite a satellite movement direction, and laterally in respect to the satellite movement direction, are maintained by a corresponding number of miniaturized optical terminals (28 to 38 and 60 to 82) carried by one of the satellites wherein, independently of the actual orbit type of the network, interruption-proof links are assured by a zero azimuth alignment of telescopes of said terminals coinciding with the tangent of the orbit of the one satellite in combination with their advanced miniaturization, as well as their arrangement on a satellite body and their possibility of coherent detection of light signals and coherent tracking of the impinging direction of light signals, wherein the networks include a LEO network.

2. An arrangement for interruption-proof operation of communication links between satellites in a network, wherein each satellite of the network describes an orbit and comprises:
   a plurality of links with neighboring satellites and a corresponding number of miniaturized optical terminals maintaining the links and being disposed on a body of the satellite along a satellite movement direction, and laterally to the satellite movement direction;

the links, independently of an actual orbit type of the network, being interruption-proof via zero azimuth alignment of telescopes of the terminals coinciding with the tangent of the orbit of the satellite and advanced miniaturization of the optical terminals, as well as disposition thereof on the satellite body, coherent detection of light signals, and coherent tracking of the impinging direction of light signals; wherein the network includes a LEO network.

3. An arrangement for the interruption-proof operation of communications links between satellites in network, each satellite describing an orbit, wherein several links with neighboring satellites (4 to 20 and 42 to 58), located in as well as laterally in respect to the satellite movement direction, are maintained by means of a corresponding number of miniaturized optical terminals (28 to 38 and 60 to 82) carried by one of the satellites wherein, independently of the actual orbit type of the network, interruption-proof links are assured by a zero azimuth alignment of the terminals' telescopes coinciding with the tangent of the orbit of the one satellite in combination with their advanced miniaturization as well as their arrangement on the satellite body and their possibility of the coherent detection of light signals and the coherent tracking of the impinging direction of light signals, and wherein the networks include a LEO network.

* * * * *